United States Patent [19]

Evans et al.

[11] Patent Number: 4,747,305
[45] Date of Patent: May 31, 1988

[54] MOVEMENT SENSING

[75] Inventors: John M. Evans; Keith Cameron; Arthur A. Keeler, all of Victoria, Australia

[73] Assignee: Commonwealth of Australia, Canberra, Australia

[21] Appl. No.: 802,004
[22] PCT Filed: Mar. 7, 1985
[86] PCT No.: PCT/AU85/00042
§ 371 Date: Jan. 7, 1986
§ 102(e) Date: Jan. 7, 1986
[87] PCT Pub. No.: WO85/04019
PCT Pub. Date: Sep. 12, 1985

[30] Foreign Application Priority Data

Mar. 7, 1984 [AU] Australia .............................. PG3946

[51] Int. Cl.$^4$ ............................................ G01C 21/10
[52] U.S. Cl. ........................................ 73/182; 73/180; 73/189
[58] Field of Search ................. 73/180, 182, 181, 179, 73/188, 189

[56] References Cited

U.S. PATENT DOCUMENTS

| | | | |
|---|---|---|---|
| 2,736,198 | 2/1956 | Kuhn | 73/180 |
| 3,379,060 | 4/1968 | Pear, Jr. | 73/189 |
| 3,500,685 | 3/1970 | Gwathmey | 73/180 |
| 3,861,211 | 1/1975 | Dewan | 73/194 A |
| 4,031,756 | 6/1977 | Rotier et al. | 73/189 |

FOREIGN PATENT DOCUMENTS

| | | |
|---|---|---|
| 2325830 | 12/1974 | Fed. Rep. of Germany . |
| 2161817 | 7/1973 | France . |
| 57-10460 | 1/1982 | Japan . |
| 700877 | 12/1953 | United Kingdom . |
| 1016315 | 8/1964 | United Kingdom . |
| 1318389 | 9/1970 | United Kingdom . |
| 2142439 | 1/1985 | United Kingdom . |

Primary Examiner—Donald O. Woodiel
Attorney, Agent, or Firm—Mason, Fenwick & Lawrence

[57] ABSTRACT

Sensing means for speed and direction of movement of a body (10) movable in an ambient fluid in a direction transverse to the longitudinal axis (11). A central chamber (16) has a plurality of radial bores (15) extending to the outer surfaces (12) and opening at their outer ends to the ambient fluid so that as the body (10) moves, a pressure differential between the inner ends (18) and the outer ends (17) causes fluid flow in the passages (15). Flow sensing means comprises a sound source and sound receivers (21) associated with respective bores (15) is provided to determine the phase shift caused by the fluid flow in each bore and hence determine the direction and speed of fluid flow. Processing means (32) determines the speed and direction of movement of body (10).

25 Claims, 3 Drawing Sheets

MOVEMENT SENSING

TECHNICAL FIELD

This invention relates to a parameter of movement of a body which is relatively movable in a fluid. The invention has been particularly developed for sensing the direction and the speed of movement of a rocket propelled vehicle in the atmosphere and it will be convenient to describe the invention with particular reference to this use, but the invention is not limited to this specific use.

BACKGROUND ART

In the past, the sensing of direction of movement of a body and particularly a vehicle such as a rocket has been achieved either by reference to some internal standard such as a compass or gyroscope or by receiving external radio signals or the like from which the direction of movement can be determined. In the past, determining the speed of movement of an aircraft, rocket or the like has been based for example on sensing the air speed of the vehicle given that orientation of the vehicle relative to the direction of movement of the vehicle is known. That is, in the past, aircraft and rockets generally have a well defined "front" or "nose" pointed in the general direction of movement and that orientation has been implicity assumed in speed sensing systems.

It has been proposed to provide a defence against self-guided target seeking missiles by means of a decoy rocket which is launched upon detecting an approaching missile. It is proposed that the decoy rocket slowly move away from the target, which may be a ship, while at the same time emitting strong signals intended to be detected by the approaching missile so that the missile will guide itself towards the decoy rocket rather than the target ship. The air data unit for collecting data used to control the flight path of such a decoy rocket is desirably self-contained, i.e. there will be no direct control from the launch site. The air data unit will be operable to gather data such as the height, movement direction and speed of the rocket, for the determination of the flight path of the rocket and the subsequent flight control operations.

The prior devices for sensing the direction and speed of movement of aircraft or rockets and briefly outlined above are believed to be unsuitable for this kind of decoy rocket for several reasons. For example, gyroscopic direction sensing systems are expected to be too expensive. Since the decoy rocket is intended to be expandable, the component parts should therefore be relatively inexpensive. Movement direction sensing based on signals received from the launch site are unsuitable, because these signals may be subject to deliberate or accidental interference. Also, the decoy rocket is intended to be movable generally horizontally in any direction without that direction of movement being accurately known or even approximately known in relation to the configuration of the rocket itself. That is, the direction of movement of the rocket in relation to the configuration of the rocket will not be known in advance or will not be known for the remainder of the flight after launch, and conventional speed sensing devices based on air speed of a rocket are expected to be unsuitable.

The problem with measuring direction and/or speed of movement of the decoy rocket relates to the configuration and nature of movement of the rocket. For example, it is expected that the decoy rocket will be generally cylindrical and may be about seven feet long and about six inches in diameter. The rocket will be launched from a tube and the slope of the launching tube initially will determine the trajectory of the rocket, although the axis of the cylindrical body is expected to be generally vertical. At operational height, the rocket is expected to have a zero or small vertical speed so that it can hover or rise slowly and also move generally horizontally to attract the approaching missile from its target. For the flight control unit of the decoy rocket to effectively operate the direction of movement of the rocket must be known at least approximately and it will be seen that this direction determination may be difficult with a tubular rocket that can move in any horizontal direction generally at right angles to the upright axis of the cylindrical body.

DISCLOSURE OF INVENTION

It is an object of the present invention to provide means for sensing a parameter of movement of a body relatively movable in a fluid in a plurality of directions relative to the configuration of the body.

It is a further object to provide movement parameter sensing means for a body relatively movable in a fluid and which can be relatively simple and inexpensive.

The movement parameter to be sensed may comprise the direction or the speed of movement of the body or both.

In the case of movement sensing means for a decoy rocket as outlined above, the sensing means is desirably able to sense relative movement of the rocket body at any possible points in its flight, including sensing a hovering condition where the body has a zero ground speed through the full range of possible expected velocities.

The movement parameter sensing means according to the present invention is for sensing a parameter of movement of a body relatively movable in an ambient fluid in a plurality of directions relative to the configuration of the body, the body having a longitudinal axis and a component of the velocity of the body relative to the fluid being transverse to the longitudinal axis. The movement parameter sensing means is characterised in that the movement parameter sensing means comprises; a plurality of passages, the passages having respective outer ends opening to the ambient fluid at locations spaced circumferentially relative to the longitudinal axis of the body and arranged such that in each passage a pressure differential between the outer end and an opposite end of that passage causes fluid flow in the passage related to the pressure difference; flow sensing means for sensing fluid flow in each passage; and processing means responsive to the flow sensing means and for determining from the sensed fluid flow a parameter of movement of the body relative to the ambient fluid.

The present invention is based on utilisation of the fluid pressure differentials that will be created around the body surface as the body moves relative to the fluid with a component of velocity of the body being transverse to the longitudinal axis of the body. For example, in the case of a generally cylindrical body such as a decoy rocket body which is arranged with its longitudinal axis generally vertical and moving in air in a horizontal direction, the portion of the body surface which is moving in a forward direction relative to the air will experience a positive net air pressure while the two "sides" of the cylindrical body will experience a negative net pressure due to the air flow over those side surface and the "back" surface will also experience a negative net pressure — see FIG. 1 of the accompanying drawings where the pressure distribution curve P around a cylindrical surface moving in a direction of arrow V is a fluid is schematically illustrated. The magnitude of the net pressure at any point on the surface of the body, at least on a relative scale, may be estimated from the pressure distribution curve P in FIG. 1 by measuring the length of a line drawn radially from the desired point on the body surface to the pressure distribution curve P.

Preferably the flowing sensing means is operable to sense the direction of flow of the fluid within each passage, the processing means being operable to determine from the sensed fluid flow directions the direction of movement of the body relative to the ambient fluid. Particular methods of determining the direction of movement of the body from the directions of flow in the passages will be described later.

In the preferred construction the chamber is provided within the body, the opposite and of each passage communicating with the chamber so that each passage extends outwardly from the chamber to the outside surface of the body and opens at the outer end to the ambient fluid. In the case where the body is generally cylindrical, such as a decoy rocket body, the chamber may be symmetrically located centrally within the cylindrical body, the passages being comprised by bores extending substantially outwardly from the chamber in a plane at right angles to the longitudinal axis of the body.

In one convenient construction the flow sensing means comprises sound propagation velocity sensing means operable to sense the propagation velocity of sound within each of the passages and hence determine the fluid flow velocity within each passage. The sound propagation velocity sensing means may comprise a sound source, the sound source being located so as to emit sound waves into all of the passages so as to travel outwardly towards ends thereof, and sound receiver associated with each passage.

BRIEF DESCRIPTION OF DRAWINGS

The accompanying drawings illustrate principles and possible preferred features of parameter sensing means according to the present invention, however, it is to be understood that the particularity of the accompanying drawings is not limiting upon the present invention. In the drawings.

MODES FOR CARRYING OUT THE INVENTION

The movement parameter sensing means of the preferred embodiment of the present invention is for sensing a parameter of movement, such as speed and/or direction of a body (10) movable in an ambient fluid. The body (10) is movable in a plurality of directions relative to the configuration of the body (10). The body (10) has a longitudinal axis (11) and a component of the velocity of the body (10) relative to the fluid is transverse to the longitudinal axis (11) as shown by the arrow V in FIGS. 1 and 3. The movement parameter sensing means comprises a plurality of passages (15), the passages (15) having respective outer ends (17) opening to the ambient fluid at locations spaced circumferentially relative to the longitudinal axis (11) of the body (10). The passages (15) are arranged such that in each passage a pressure differential between the outer end (17) and an opposite end (18) of the passage (15) causes fluid flow in the passage related to the pressure difference. Flow sensing means (20,21) is provided for sensing fluid flow in each passage (15). Also processing means (32) is provided and which is responsive to the flow sensing means (20,21) so as to determine from the sensed fluid flow a parameter of movement of the body (10) relative to the ambient fluid.

Figures 1, 2, 4:
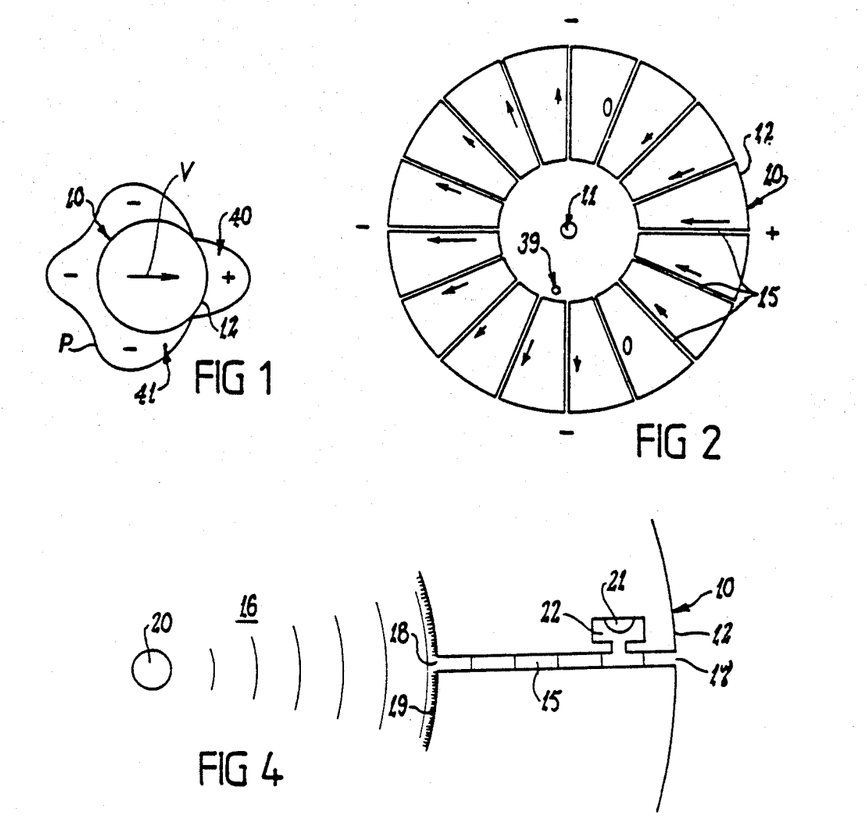
FIG. 1 shows the air pressure distribution around a cylinder moving in the direction of arrow V in air transverse to the cylinder axis.
FIG. 2 shows a cross section through a cylindrical rocket body having a central chamber with radial passages.
FIG. 4 shows a sound source and the location of sound receivers associated with the passages.

The preferred flow sensing means is operable to sense the direction of flow of the fluid within each passage (15), ie. whether from the outer end (17) towards the opposite end (18) or visa versa, and the processing means (32) is accordingly operable to determine from the sensed fluid flow directions the direction of movement of the body (10) relative the ambient fluid. For example, if a relatively large number of spaced around the circumference of the body (10) and with the open outer ends (17) lying in a plane substantially at right angles to the longitudinal axis (11) of the body (10), the processing means would be operable to determine in which passages (15) there is occuring a flow from the outer and (17) towards the opposite end (18), and therefore which passages (15) are opening into a net positive pressure region (40) of the ambient fluid. Due to the nature of the ambient fluid relative pressure distribution around the body (10) the passages (15) which are experiencing a net positive pressure at their outer ends (17) can be expected to be arranged in a well defined sector of the as best seen in FIG. 1, is centered on the direction of relative movement V of the body (10) in the fluid. In this case the processing means (32) is operable to determine whichever one of the passages (15a) has its outer and (17) centrally located within the sector of outer ends so as to thereby determine the passage (15a) falling closest to the line of relative movement V of the body (10) and hence thereby approximately determine the line of relative movement of the body at the line running from the longitudinal axis (11) through the outer end (17) of the central passage (15a) of the sector. That is, effectively, the processing means (32) determines direction of movement of the body (10) relative to the fluid by determining the central one (15a) of the passages (15) experiencing flow from the outer ends (17) to the opposite ends (18).

Figure 3:
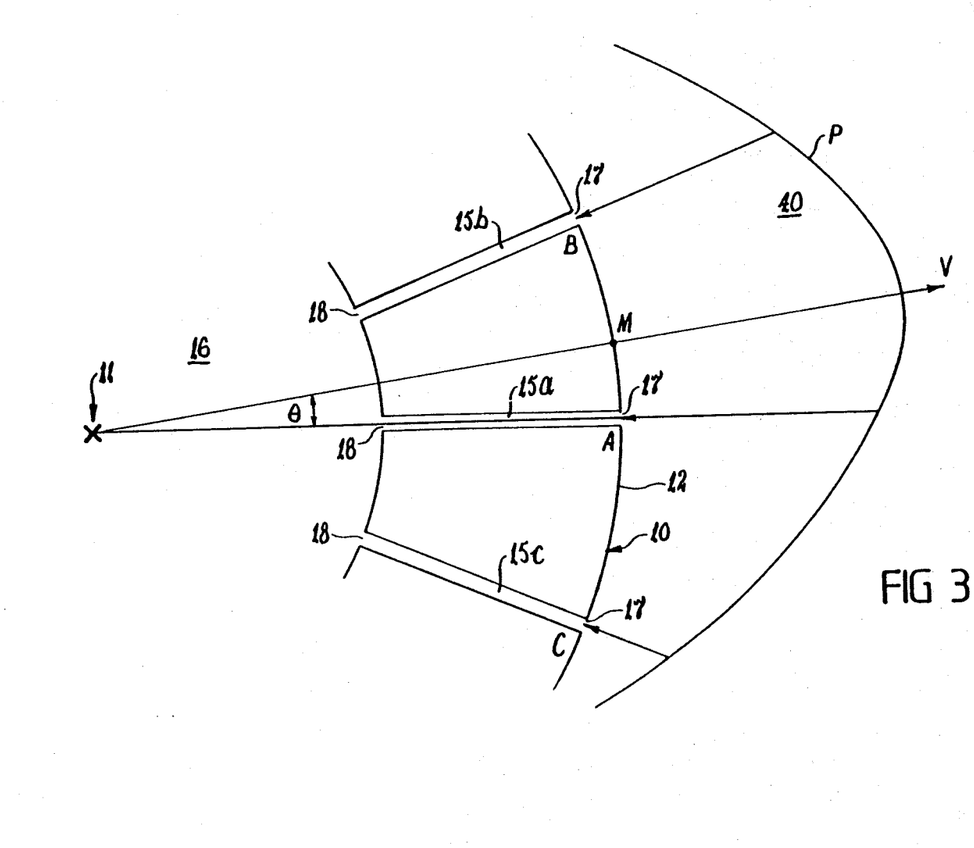
FIG. 3 shows a detail illustrating direction calculation by interpolation between maximum and second largest inward flow speed passages.

Alternatively, or preferably in addition, the flow sensing means (20,21) may be operable to sense the speed of flow of fluid in each passage (15) and the processing means (32) is operable to determine from the sensed flow speeds in the passages (15) the relative speed of the body (10) within the ambient fluid. For example, the processing means (32) may be operable to determine whichever one (15a) of the plurality of passages (15) has the maximum speed of fluid flow in the direction from its outer end (17) to its opposite end (18), this passage (15a) being determined as the one having its outer end (17) closest to the line of relative movement V of the body in the ambient fluid passing through the body longitudinal axis (11). Also preferably the processing means (32) is operable not only to determine the passage (15a) experiencing the maximum flow velocity from the outer end (17) to the opposite end (18), but also to determine which passage (15a) as the second largest flow speed from its outer end (17) to its opposite end (18), and preferably also the passage (15c) with a third largest speed in the same direction, and to interpolate from these determinations and from the respective flow speeds in the maximum speed, the second and third largest speed passages whether the actual relative movement of the body (10) in the ambient fluid lies in the direction along a line V from the longitudinal axis (11) crossing the body surface (12) between the outer ends of the maximum speed passage (15a) and the second maximum speed passage (15b) and, if so, at what angle $\theta$ to the line through the outer end (17) of the maximum speed passage (15a) the actual direction V of relative movement of the body (10) occurs. The determination of the angle $\theta$ of the line of actual movement to the line from the body axis (11) to the outer end (17) of the maximum flow speed passage (15a) may be made from the known characteristics of the fluid pressure distribution represented by the curve P around a cylinder moving in the fluid and from running an interpolation algorithm to find the pressure distribution best fitting or most consistent with the measured flow speeds in the maximum, second largest and possibly third largest flow speed passages (15a), (15b), (15c). The best fit pressure determination then provides an estimate of the body surface point M where the maximum net fluid pressure is expected, and the line from the body axis (11) through this point M is therefore determined to approximate the line of actual relative movement V of the body (10) in the fluid.

The speed of flow of fluid within the passages (15a), (15b) having the maximum fluid flow speed from the outer end (17) to opposite end (18) may not be equal to the true speed of the body (10) relative to the ambient fluid, but will be related to that true speed. Therefore the processing means (32) may be operable to determine from the determined actual direction of relative movement of the body (10) and from the speed of flow in the passage (15a) having the maximum fluid flow speed the actual speed of movement of body (10) relative to the ambient fluid.

In the embodiment in the drawings for movement parameter sensing means includes a chamber (16) within the body (10), the opposite end (18) of each passage (15) communicating with the chamber (16) so that each passage (15) extends outwardly from the chamber (16) to the outside surface (12) of the body (10) and opens at that outer end (17) to the ambient fluid. In the case where the body (10) is generally cylindrical, the chamber (16) is symmetrically located centrally within the cylindrical body (10) and the passages (15) are comprised by substantially identical bores extending straight from the chamber (16) within the body (10) to the outside surface (12) of the body. As shown in FIGS. 2 and 3, the bores (15) extend substantially radially from the chamber (16) in a plane at right angles to the axis (11) of the body (10). The bores (15) are provided at equal angular intervals, the intervals in the illustrated case being of 30°, however more bores at smaller angular intervals may be provided. In the illustrated case there are twelve radial bores spaced at equal 30° intervals around the longitudinal axis (11) of the body (10).

Figure 5:
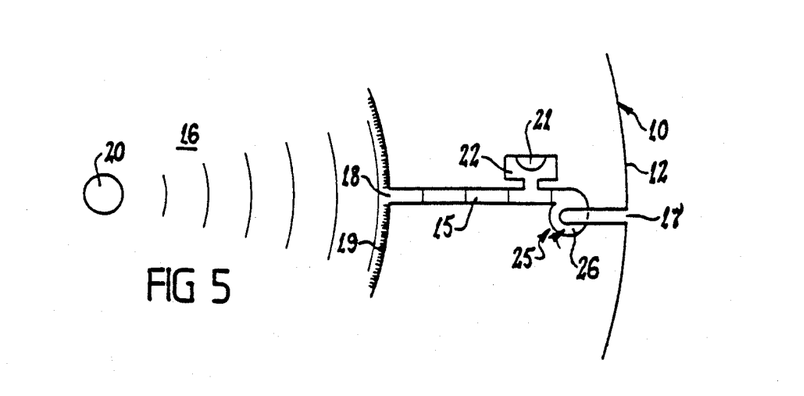
FIG. 5 shows a passage having a fluidic diode for preferentially restricting flow in the outwards direction.

The chamber (16) is of relatively large volume compared to the total volume of the radial bores (15) whereby the fluid pressure within the chamber (16) remains approximately constant. Under steady conditions with the body (10) moving in a direction transverse to the body axis (11) at a constant velocity relative to the ambient fluid, it is expected that the pressure within the chamber (16) will not be equal to the ambient fluid pressure since there will be a net outflow of fluid from the chamber (16) through the passages (15) to the ambient fluid upon the initial movement of the body (10) due to the pressure distribution around the body (10). This results in a fluid pressure within the chamber (16) which is slightly less than the ambient fluid pressure. However it is envisaged that it is possible and indeed desirable to arrange the passages so that the fluid pressure within the chamber (16) will be substantially equal to the ambient pressure. This is achieved in the illustrated embodiment by providing each of the bores with a flow restrictor (25) which restricts the flow of fluid in the direction from the inner end (18) communicating with the chamber (16) to the outer end (17) more than the flow of fluid from the bore outer end (17) to the inner end (18) opening to the chamber (16) whereby the fluid pressure within the chamber is generally maintained substantially equal to the ambient fluid pressure. For example, the flow restrictor (25) may comprise a valve means (not shown) which allows substantially unrestricted flow in the inwards direction but which restricts, without entirely preventing, flow in the outwards direction. The preferential direction flow restrictor (25) may alternatively comprise a fluidic diode (26) (FIG. 5) located in its respective bore (15), the fluidic diode (26) being operable to provide a lesser resistance to flow in the direction from the bore outer end (17) to the inner end (18) and in the opposite direction. The ratio of the flow resistances is chosen so that the chamber pressure within the body (10) substantially equals the ambient pressure. The choice of this ratio may be chosen by the man skilled, for example by conducting wind tunnel tests of the body with fluidic diodes having different flow resistant ratios for a series of tests.

The flow sensing means (20,21) in the illustrated embodiment comprises sound propagation velocity sensing means operable to sense the propagation velocity of sound within each of the passages (15) and hence determine the fluid flow velocity within each passage (15). The sound propagation velocity sensing means comprises a sound source (20) and a sound receiver (21) associated with each passage (15). The sound source may comprise an ultrasonic source and the sound receiver (21) a device sensitive to ultrasonic sound. However, ultrasonic sound is not essential and any frequency of sound may be used although it is expected that higher frequency sound will be most convenient because of less acoustic interference from the rocket. The ultrasonic sound source (20) may comprise a piezo-ceramic device to which an AC voltage is applied. This type of device is well known and readily obtainable. The frequency of the AC voltage applied to the piezo-ceramic device determines the frequency of the sound generated. It is expected that an AC frequency, and hence the sound frequency, of about 40 KHz would be suitable. The ultrasonic sound receiver (21) can be of generally similar construction to source (20). That is, the receiver (21) may comprise a piezo-ceramic device arranged to encounter the sound waves, the receiving of the sound waves inducing an alternating voltage between two electrodes coupled to the piezo-ceramic device (21). In the preferred construction where there is provided the central chamber (16) and the passages (15) are arranged radially relative to the chamber (15), the sound source (20) is located so as to emit sound waves into all of the passages so as to travel outwardly towards the outer ends (17) thereof. This is achieved by providing the single sound source (20) at the center of the chamber (16), the source (20) being operative to emit sound waves in all directions. In this arrangement the inside surface (19) of the chamber (16) may be sound absorbent to prevent or at least inhibit sound reflections within the chamber (16) and hence the propagation of reflected sound waves which might otherwise possibly result in spurious signals being received by the sound receivers (21).

The sound receivers (21) may be located within the passages (15) towards the outer ends (17). However, in the illustrated case which is designed for relatively small piezo-cermic devices and using high frequency sound waves it is possible to detect the sound waves propagating outwardly within the passages (15) from detection points located laterally off the passages (15). That is, the sound receivers (21) need not be located directly within the passages (15) and hence need not create obstructions to fluid flow within the passages (15). In the illustrated case, the sound receivers (21) are located in respective receiver chambers (22) located laterally of the respective passages (15) and in fluid communication therewith for propagation of high frequency sound waves into the receiver chambers (22).

In the case of the rocket for moving in air, sound propagates in still air at a speed of about 340 meters per second. This speed varies depending upon the air temperature in accordance with the following approximation:

$$a \simeq 20\sqrt{T}$$

where a is the speed of sound, and

T is the temperature in degrees Kelvin.

Over the temperature range of interest it is possible to approximate as follows:

$$a = x + 0.6T$$

where a is the speed of sound x is a constant, and

T is the temperature in degrees Celsius.

Because the speed of sound in the passages (15) is to be accurately measured, the variation of the speed of sound due to changes in ambient air temperature needs to be taken into account. Accordingly therefore a temperature sensor (39) is provided within the body (10) and preferably as shown in FIG. 2 within the chamber (16), providing to the processing means (32) a temperature signal representing the temperature of fluid in the passages (15). The processing means (32) is operable to compensate for temperature variations in its determination of the parameter movement of the body (10).

If air is moving in the direction from a sound source to a sound receiver, the sound will arrive at the receiver earlier, and vice versa. For example, assuming a still air sound velocity of 340 meters per second, if there is a 50 meter per sound air flow from the source to receiver, the sound will propagate at 390 meters per second between the source and receiver. Thus, inward, outward and zero flow of air in the passages (15) will produce characteristic changes in the speed of propagation of the sound waves within the respective passages. The effect of varying the speed of propagation is to provide variations in the phase of the received ultrasonic signal relative to the signal generated by the source (20). Thus, the flow sensing means and processing means (32) are preferably operable to determine phase shifts in the sound signals received by the sound receivers (21).

In one possible construction the processing means (32) is operable to detect a phase shift between the sound transmitted by the source (20) and the sound received by each sound receiver (21) by creating an interval commenced at a predetermined point in the cycle of operation of the sound source (20) and terminated at a predetermined point in the cycle of the received sound signal, the duration of the interval providing a measure related to the phase shift of the received signal. For example, the interval may be initiated at a particular zero crossing of the AC signal being used to drive the piezo-ceramic sound source (20). The interval may be terminated similarly by a particular zero crossing of the induced AC signal at the sound receiver (21). A predetermined number of cycles of the transmitted sound signal may be arranged to be generated by the sound source (20) before termination of the interval and therefore the processing means (32) includes a zero crossing detector (33) (FIG. 6) receiving signals from the sound receiver (21) and driving a counter (34), the output of the counter (34) being used to terminate the interval after a predetermined number of zero crossings have been detected. For example, the number of zero crossings may be seven, corresponding to 3½ cycles of the received sound signal.

Figure 6:
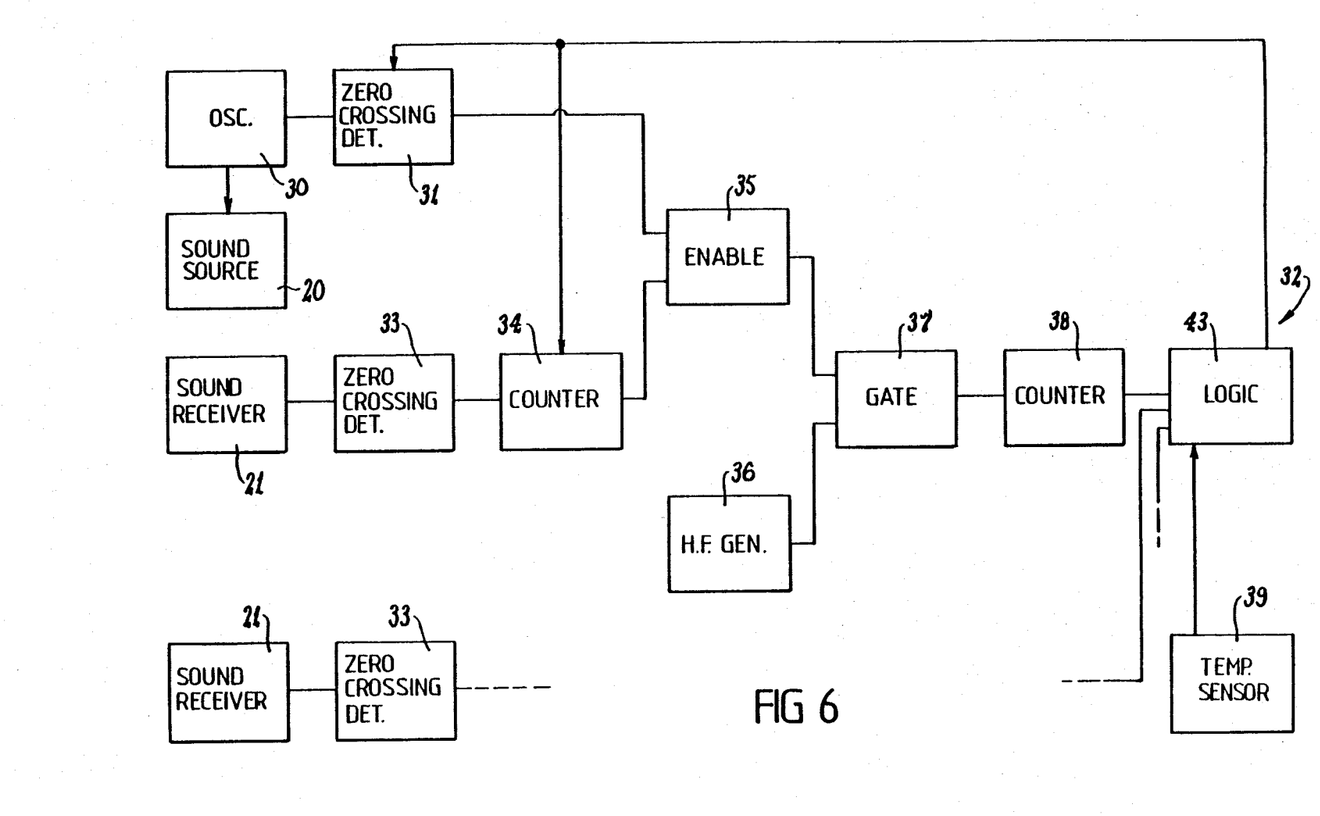
FIG. 6 shows a block schematic circuit diagram of processing means and associated circuitry for determining the velocity of the body.

During the interval created, the processing means (32) is operable to determine the duration thereof by injecting a high frequency signal from generator (36), e.g. of 16 MHz, into a counter (38) for the duration of the interval. The number of cycles of the high frequency signal registered by the counter (38) will be related to the phase shift between the transmitted and received signals, and thereby related to the speed and direction of air flow within the respective passage (15). The high frequency signal is applied to the counter (38) through a gate (37) which is enabled in response to the initial zero crossing of the transmitted signal as detected by detector (31) and which is finally disabled by the counter (34) driven by the zero crossing detector (33) associated with the signal receiver (21). That is, the high frequency signal is applied to the counter (38) only during the interval created by the processing means (32). The output of the high frequency counter (38) is preferably applied to a logic unit (43) of the processing means (32) which is operable to determine from the number of cycles registered by the counter (38) the velocity (speed and direction) of the fluid flow in the respective passage (15).

The processing means (32) is preferably operable to sequentially determine the air flow velocities in all the passages (15) and to determine therefrom the speed and direction of the body (10) relative to the ambient fluid. In order to compensate for any random fluctuations in fluid flow within the respective passage (15) or random errors in operation of the movement parameter sensing means, the processing means (32) is preferably operable to average the determination of phase shifts or to average the air flow velocities determined for each passage over a number of such determinations thereby averaging any errors and providing a greater accuracy of speed and direction determination.

The preferred construction and operation of the movement parameter sensing means is for use with a decoy rocket for launching, say, from a ship. The chamber (16) is located centrally within the cylindrical body (10) of the rocket and the passages (15) extend radially from the chamber (16) to the outside of the body (10), the outer ends (17) of the passages (15) being in a plane at right angles to the axis (11) of the cylindrical rocket body (10). Immediately prior to launching of the decoy rocket the processing means (32) may be programmed with the average absolute wind velocity at that moment, so that the processing means (32) can carry out a vector subtraction of that velocity from the determined relative air velocity of the rocket in the horizontal plane and thereby determine the absolute horizontal movement speed and direction of the decoy rocket. Of course, other data may be programmed into the processing means (32) immediately before launch such as the ship's speed and course, the approaching missile's course and any other desired data.

The decoy rocket is launched and travels in such a way that it slowly moves away from the launching ship with the intention of attracting the approaching missile away from the ship and towards itself. In order to adopt a movement which takes the decoy rocket horizontally away from the launching ship in such a way as to draw the approaching missile away from the ship, the movement sensing means of the present invention is operable to determine both the direction and speed of horizontal movement of the rocket itself not only relative to the ambient air but also, using the data concerning wind velocity programmed immediately before launch, in an absolute sense and also relative to the subsequent ship movements that may have been programmed prior to launch.

After launch, the relative flow of air over the outside surface (12) of the rocket body (10) creates net positive and negative pressure regions (40, 41) at various parts of the circumferential surface of the rocket body resulting in air flowing inwardly to the central chamber (16) in the passages (15) in the leading sector of the cross-section of the rocket body and air flowing outwardly in the passages (15) around the "sides" and "back" of the rocket body. The sound source (20) in the centre of the chamber (16) is continuously energised to generate ultrasonic sound waves which propagate outwardly and into each of the radial passages (15). The sound receivers (21) continuously detect the sound waves propagating in each of the respective passages (15). The processing means (32) is operable to create a sampling interval for each sound receiver (21) in turn, the commencement of the interval being initiated by a zero crossing of the AC signal from oscillator (30) driving the sound source (20) and being terminated by the seventh zero crossing of the received signal after the initiating of the interval. During that sampling interval, a high frequency signal is applied to a counter (38), the final registered count being supplied to logic circuit means (43) of the processing means (32) for determining the air flow velocity (both speed and direction) within the respective passage (15). The processing means (32) is operable to average the determined flow velocities in each passage (15) over a number of sampling cycles in order to compensate for random fluctuations in the determined velocity. From the determined directions and speeds of airflows in all of the passages (15), the relative horizontal velocity (both speed and direction) of the rocket body (10) in the ambient air can be determined and hence either or both of the absolute ground velocity of the rocket and velocity of the rocket relative to the launching ship.

The movement parameter sensing means of the present invention may be used with the pressure sensing means described in the Australian patent application No. PG 3947 being lodged at the same time as this application. Reference may be made to that other application or the PCT application based thereon for further details.

The movement parameter sensing means of the preferred embodiment of the present invention as herein described is relatively simple in construction and consists of components which can be cheaply manufactured and assembled. However, it is expected that the accuracy of the velocity determination will be quite high.

We claim:

1. A movement parameter sensing device for sensing a parameter of movement of a body (10) relatively movable in an ambient fluid in a plurality of directions relative to the configuration of the body, the body (10) having a longitudinal axis (11) and a component of the velocity of the body (10) relative to the fluid being transverse to the longitudinal axis (11) characterized in that the movement parameter sensing device comprises:
    a chamber within said body;
    a number of passages (15) extending from said chamber to an outer surface of said body,
    each of said passages (15) having an outer end (17) which is open to said ambient fluid and an inner end which communicates with said chamber,
    said outer ends being located in spaced relationship circumferentially to said longitudinal axis (11) of the body (10),
    the arrangement of said passages being such that fluid will flow between the ends (17, 18) of each of a plurality of said passages (15) as a consequence of movement of said body (10) through said ambient fluid,
    flow sensing means (20, 21) associated with each said passage and being operable to sense at least one characteristic of said fluid flow in the respective passage (15), and
    processing means (32) operable to receive from each said sensing means a signal representative of the sensed fluid flow characteristic of the respective passage and to relate said received signals to determine said parameter of movement.

2. A movement parameter sensing means as claimed in claim 1 characterized in that the flow sensing means (20, 21) is operable to sense the direction of flow of the fluid within each passage (15),
    said processing means (32) being operable to determine parameter of movement by reference to a comparison of said flow directions as sensed for said passages.

3. A movement parameter sensing means as claimed in claim 2 characterised in that said passages (15) are provided with their outer ends (17) spaced around the circumference of the body (10) and lying in a plane substantially at right angles to the longitudinal axis (11), the processing means (32) being operable to determine in which passages (15) there is occurring a flow from the outer end (17) towards the opposite end (18) and therefore which passages (15) are opening at their outer ends (17) to a net positive pressure region (40) of the ambient fluid.

4. A movement parameter sensing means as claimed in claim 3 characterised in that the passages (15) experiencing a net positive pressure at their outer ends (17) are arranged in a sector of the circumference which sector, due to the symmetry of the ambient fluid pressure distribution, is centered on the direction (V) of relative movement of the body in the fluid, the processing means (32) being operable to determine whichever one (15a) of the passages (15) has its outer end (17) centrally located within the sector of outer ends (17) so as to thereby determine the line of relative movement of the body as the line running from the longitudinal axis (11) of the body (10) through the outer end (17) of the central passage (15a) of the sector.

5. A movement parameter sensing means as claimed in claim 4 characterised in that the processing means (32) is operable to determine from the determined actual direction (V) of relative movement of the body (10) and from the speed of flow in the passage (15a) having the maximum fluid flow speed the actual speed of movement of the body (10) relative to the ambient fluid.

6. A movement parameter sensing means as claimed in claim 3 characterised in that the flow sensing means (20,21) is further operable to sense the speed of flow of fluid in each passage (15), the processing means (32) being operable to determine whichever one (15a) of the plurality of passages (15) has the maximum speed of fluid flow in a direction from its outer end (17) to its opposite end (18), this passage (15a) being determined as the one having its outer end (17) closest to the line (V) of relative movement of the body in the ambient fluid passing through the body longitudinal axis (11).

7. A movement parameter sensing means as claimed in claim 5 characterised in that the processing means (32) is further operable to at least determine which passage (15b) has the second largest flow speed from its outer end (17) to its opposite end (18) and to interpolate from this determination adn from the respective flow speeds in the maximum speed and second largest speed passages (15a,15b) whether the line (v) of actual relative movement of the body (10) in the ambient fluid lies in a direction along a line from the longitudinal axis (11) crossing the body surface (12) between the outer ends (17) of the maximum speed passage (15a) and the second maximum speed passage (15b) and, if so, at what angle (θ) to the line through the outer end (17) of the maximum speed passage (15a) the actual direction (V) of relative movement of the body (10) occurs.

8. A movement parameter sensing means as claimed in claim 1 characterised in that the body (10) is generally cylindrical and the chamber (16) is symmetrically located centrally within the cylindrical body (10), the passages (15) being comprised by bores extending substantially radially outwardly from the chamber (16) in a plane at right angles to the axis (11) of the body (10).

9. A movement parameter sensing means as claimed in claim 8 characterised in that the chamber (16) is of relatively large volume compared to the total volume of the radial bores (15) whereby the fluid pressure within the chamber (16) remains approximately constant.

10. A movement parameter sensing means as claimed in claim 9 characterised in that each of the bores (15) includes a flow restrictor (25) which restricts the flow of fluid in the direction from the inner end (18) communicating with the chamber (16) to the outer end (17) more than the flow of fluid from the bore outer end (17) to the inner end (18) opening to the chamber (16) whereby the fluid pressure within the chamber (16) is generally maintained substantially equal to the ambient fluid pressure.

11. A movement parameter sensing means as claimed in claim 10 wherein each flow restrictor (25) comprises a fluidic diode (26) located in its respective bore (15), the fluidic diode (26) being operable to provide a lesser resistance to flow in the direction from the bore outer end (17) to the inner end (18) than in the opposite direction and the ratio of the two flow resistances being chosen so that the chamber pressure within the body (10) substantially equals the ambient pressure.

12. A movement parameter sensing means as claimed in claim 1 characterised in that the flow sensing means (20,21) comprises sound propagation velocity of sensing means operable to to sense the propagation velocity of sound within each of the passages (15) and hence determine the fluid flow velocity within each passage.

13. A movement parameter sensing means as claimed in claim 12 characterised in that the sound propagation velocity sensing means comprises a sound source (20) and a sound receiver (21) associated with each passage (15).

14. A movement parameter sensing means as claimed in claim 13 characterised in that the sound source (20) is located so as to emit sound waves into all of the passages (15) so as to travel outwardly towards the outer ends (17) thereof.

15. A movement parameter sensing means as claimed in claim 13 wherein the sound source (20) is operable to generate high frequency sound waves, each of said sound receivers (21) being located in a respective receiver chamber (22) located laterally of the respective passage (15) and in fluid communication therewith for propagation of high frequency sound waves into the receiver chamber (22).

16. A movement parameter sensing means as claimed in claim 13 characterised in that the processing means (32) is operable to detect a phase shift between the sound transmitted by the source (20) and the sound received by each sound receiver (21) by creating an interval commenced at a predetermined point in the cycle of operation of the sound source (20) and terminated at a predetermined point in the cycle of the received sound signal, the duration of the interval providing a measure related to the phase shift of the received signal.

17. A movement parameter sensing means as claimed in claim 16 characterised in that the processing means (32) is operable to average the determination of phase shifts, or to average the air flow velocities determined, for each passage (15) over a number of such determinations so as to compensate for any random fluctuations in fluid flow within the respective passage (15) or random errors in operation of the movement parameter sensing means.

18. A movement parameter sensing means as claimed in claim 12 and further characterised by a temperature sensor (39) within the body (10) for providing to the processing means (32) a temperature signal representing the temperature of fluid in the passages (15), the processing means (32) being operable to compensate for temperature variations in its determination of the body movement parameter.

19. A movement parameter sensing means for sensing a parameter of movement of a body (10) relatively movable in an ambient fluid in a plurality of directions relative to the configuration of the body, the body (10) having a longitudinal axis (11) and a component of the velocity of the body (10) relative to the fluid being transverse to the longitudinal axis (11) characterized in that the movement parameter sensing means comprises: a plurality of passages (15), the passages (15) having respective outer ends (17) opening to the ambient fluid at locations spaced circumferentially relative to the longitudinal axis (11) of the body (10) and arranged such that in each passage (15) a pressure differential between the outer end (17) and an opposite end (18) of that passage (15) causes fluid flow in the passage (15) related to the pressure difference; sound propagation velocity sensing means for sensing the propagation velocity of sound within each of said passages (15) and hence determine the fluid flow velocity within each passage; and processing means (32) responsive to the flow sensing means (20), (21) and for determining from the sensed fluid flow a parameter of movement of the body (10) relative to the ambient fluid.

20. A movement parameter sensing means as claimed in claim 19 characterized in that the sound propagation velocity sensing means comprises a sound source (20) and a second receiver (21) associated with each passage (15).

21. A movement parameter sensing means as claimed in claim 20 characterized in that the sound source (20) is located so as to emit sound waves into all of the passages (15) so as to travel outwardly towards the outer ends (17) thereof.

22. A movement parameter sensing means as claimed in claim 20 wherein the sound source (20) is operable to generate high frequency sound waves, each of said sound receivers (21) being located in a respective receiver chamber (22) located laterally of the respective passage (15) and in fluid communication therewith for propagation of high frequency sound waves into the receiver chamber (22).

23. A movement parameter sensing means as claimed in claim 20 characterized in that the processing means (32) is operable to detect a phase shift between the sound transmitted by the source (20) and the sound received by each sound receiver (21) by creating an interval commenced at a predetermined point in the cycle of operation of the sound source (20) and terminated at a predetermined point in the cycle of the received sound signal, the duration of the interval providing a measure related to the phase shift of the received signal.

24. A movement parameter sensing means as claimed in claim 23 characterized in that the processing means (32) is operable to average the determination of phase shifts, or to average the air flow velocities determined, for each passage (15) over a number of such determinations so as to compensate for any random fluctuations in fluid flow within the respective passage (15) or random errors in operation of the movement parameter sensing means.

25. A movement parameter sensing means as claimed in claim 19 and further characterized by a temperature sensor (39) within the body (10) for providing to the processing means (32) a temperature signal representing the temperature of fluid in the passages (15), the processing means (32) being operable to compensate for temperature variations in its determination of the body movement parameter.

* * * * *